Inventors:
Stanley George Meadows,
Lester Wallas, and Edward Searles
By
Richard Lovell Cleaver  Attorney

FIG. 4.

United States Patent Office 2,769,958
Patented Nov. 6, 1956

2,769,958

AUTOMATIC MEASURING AND PRINTING APPARATUS

Stanley George Meadows, Hornchurch, Lister Hallas, Romford, and Edward Searles, Plumstead, London, England, assignors to Southern United Telephone Cables Limited, Dagenham Dock, Essex, England Application May 25, 1953, Serial No. 356,972

8 Claims. (Cl. 324—73)

This invention is concerned with the automatic obtaining and recording of readings of an instrument or a group of instruments. It does not deal with recording by means of marking points or lines of a chart but provides for the printing of the readings by means of type on a record sheet. The result attained in this recording is the production of columns of figures with or without signs typed in appropriate positions on the record sheet.

The term "reading" is used herein as indicating a value to which an instrument (or group of instruments) is set. It is possible that the instrument may be such that a visual indication is given so that an actual reading can be taken. In many cases, however, this will not be so and it is not necessary for the operation of the invention.

In apparatus embodying the invention the device by which the record is printed may be a modified typewriter. Such an arrangement has the advantage that ordinary hand operation of the keys to add typed matter at will on the record sheet may be used. The essential of the printing device is that it contains a number of type-operating means each adapted to print one or more numerals or signs and each under electro-mechanical control in combination with a carrier for the record sheet and means for producing relative movement between the sheet and the type, that is moving the position of the typing step-by-step across the sheet (spacing movement).

The electro-mechanical control device for operating a type may consist of an electro-magnet, the armature of which is attached to the lever of the type so as to pull this downward when the magnet is excited thus giving an effect equivalent to the action of the finger on the key.

The apparatus also comprises a switching device which is set for each of the readings to be recorded to predetermine the matter to be typed and a further switching device which predetermines the position on the record sheet at which the typed matter appears. The first of said switching devices provides circuit connections for printing one or more columns of figures, with or without signs. The second of said switching devices is actuated by the spacing movement of the carrier relative to the type on the printing device. This latter switching device sets up connections dependent upon the position of the carrier. The two sets of connections co-act and in this way a circuit is established for each pair of associated positions of the switching devices to cause the actuation of a type member appropriate for printing a part of the reading at the correct position on the record sheet.

One example of a recording to which the invention can be applied is the testing of the groups of wires (quads) of a telephone cable for the purpose of ascertaining certain of their electrical properties, such as capacities, resistances and standard of or integrity of insulation. These require for each quad the taking of a number of readings in appropriate sequence and the recordings of these readings in one line for each quad extending across the sheet so that the respective readings appear in their appropriate columns.

In accordance with the present invention the first of the said switching devices is represented by a set of relays arranged to act in sequence and in steps to add to or subtract from the impedance of a testing bridge or other measuring device until a balance is reached, each addition or subtraction being accompanied by the setting up, by means of relay contacts, of a circuit for an electro-magnet or for electro-magnets which actuate the type of the printing device. The circuits so set up co-act with circuits established by a position switch actuated by the movement of the record carrier.

The printing circuits which have been set up by the relays are held until the printing of the record item is complete and are then cleared and the relays restored to their starting condition by the movement of the position switch.

Each relay may be considered in three functional aspects. The first relates to the excitation of its operating coil circuit. The second is concerned with the effect of the relay in producing adjustment of the testing circuit by addition or subtraction by the use of contacts associated with the relay and the testing circuit. In the third the effect of the relay on the printing operation is seen.

The excitation of the relays is so arranged that they are self-selecting and self-propagating until stopped at balance of the testing circuit. They can be arranged as a decade system with automatic transfer from units to tens and from tens to hundreds so that any value in the range of operation between the maximum and minimum can be attained by steps of unit value. Binary or other combinations of figures, however, can be used in place of a decade system if required.

For operation in a decade system there will be a set of nine relays for the unit steps, followed by a relay or relay group which transfers between the units and tens and a set of tens relays to the number required. If this number is nine it may be followed by one or more hundred relays. The transfer arrangement between adjacent denominations (units and tens or tens and hundreds) is so arranged that at transfer all the relays in the lower denomination are cleared, that is returned to their initial condition.

An advantage of this relay arrangement is that a single set of relays can serve for adjusting two or more kinds of quantities, such, for instance, as capacity and resistance, by a simple switching arrangement, thus enlarging the scope of the testing apparatus in a very simple manner.

In the printing arrangement an electro-magnet for each of the numerals required (usually 0, 1, 2, 3, 4, 5, 6, 7, 8, 9) is provided together with the signs plus and minus where a distinction has to be made between the positive and negative quantities. The circuit for each of the numeral magnets is controlled by a relay in each denomination (units, tens, hundreds) to the upper limit required, these circuits being set by the relays to the result arrived at when adjustment of relays is stopped at the balance of the testing device. The association of these adjusted circuits with the selecting effect of the position switch on the printing device chooses the appropriate magnet for printing the number of the required denomination in each line of the record. For instance, in a three figure number the hundred numeral is made to appear in the first position, the tens numeral in the second position and the unit numeral in the third position.

Where a sign has to appear before the number it may be preferred to have this sign movable in position so that it always occurs directly in front of a numeral whether the number consists of one, two or three figures. This can be done by the co-operation of the magnet circuits as set by the relays and the position switch.

The arrangements were described above with particular reference to the making and recording of a single test, They can be made to repeat their operations so that a series of tests follow one after the other and the results are printed in columns across the sheet. For arranging that such a set of tests take place in sequence, a rotary switch, for instance a switch of the uni-selector type, may be arranged to be stepped from one angular position to the next by the movement of the position switch from one position to another when the printing device completes the printing of a test result. This rotary switch can then be used to produce the necessary changes in the connections between the parts to be tested, for instance quads of a cable, and the testing apparatus, for instance one or more bridges.

The invention will be further described in connection with an apparatus for the automatic recording of a sequence of four tests on each of the quads of a telephone cable. In the description of the apparatus it will be assumed that it is to be used for what is known as "core testing" of a telephone cable, that is testing of the quads, each containing four insulated conductors, after the quads have been laid up together to form the cable but before the sheath has been applied. The apparatus is described by way of example and with reference to the accompanying drawings wherein:

Figure 1:
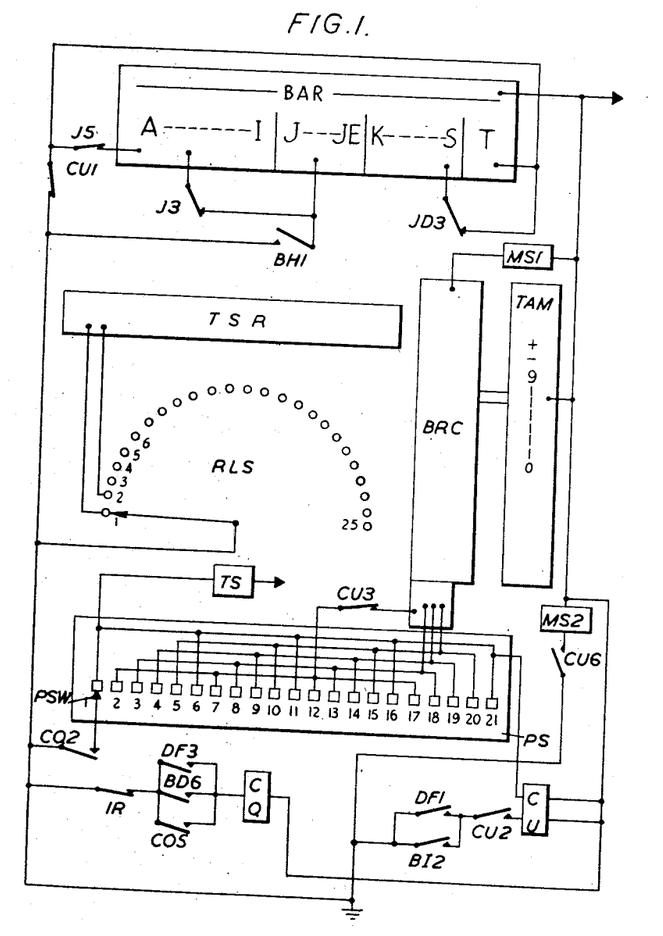
Figure 1 is a block diagram illustrating the general arrangement of that part of the apparatus incorporating the main features of the invention, and Figures 2–5 together constitute a detailing circuit diagram of the complete apparatus.
Figure 2:
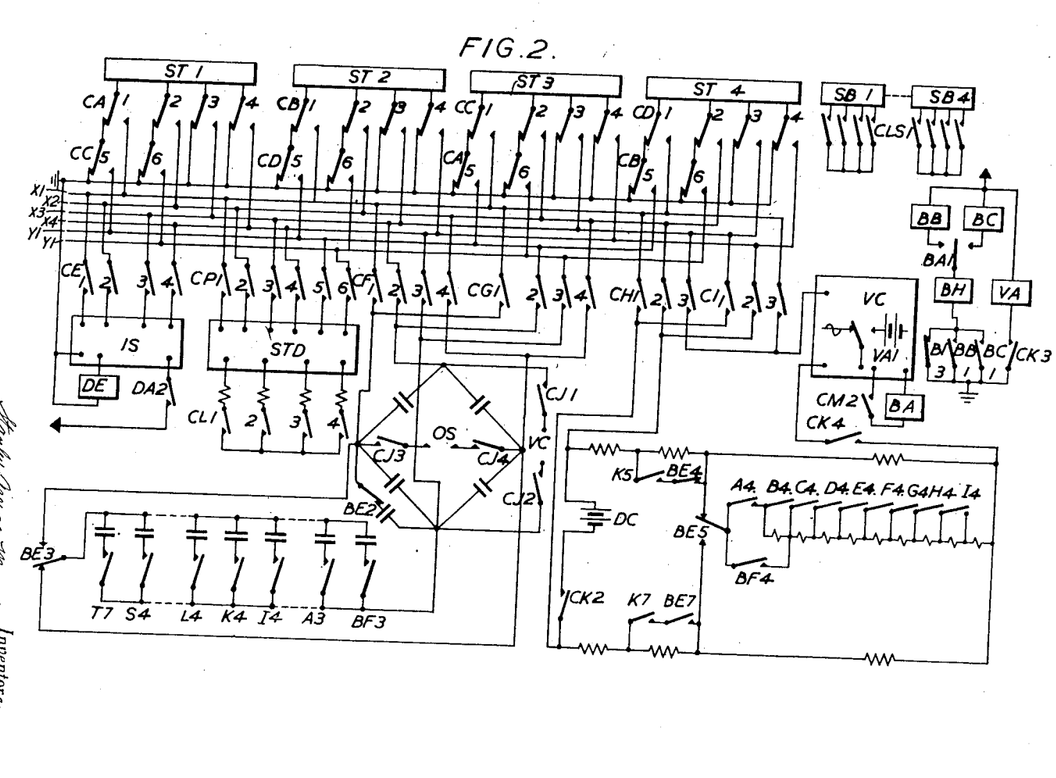

In the block diagram, Figure 1, where double lines are shown connecting two pieces of apparatus the convention is adopted that they represent a large number of wires appropriate for the connection of the two pieces of apparatus. In all the figures a triangle at a free end of a line indicates its connection to one side of a source of direct current of which the other side is earthed. All the magnet and relay coils are directly connected to the D. C. supply and are energised by completing the appropriate circuits to earth terminals represented by the conventional sign in the drawings. The switches are shown in the normal condition corresponding to none of the relays and magnets being energised, and the position switch is in the first position.

The four tests to be carried out are one for within-quad capacity unbalance, one for inter-quad capacity unbalance and two for resistance unbalance, the first two by balancing a capacity bridge and the last two by balancing a resistance bridge. The tests are recorded by a modified typewriter, the carriage of which operates a position switch PS comprising a wiper PSW moved by the carriage over a fixed line of twenty-one contacts. The position switch provides one fixed contact for each recording position or space in the columns of the record. The types for printing the numerals 0–9 and the signs, plus and minus, can be actuated by a group of type actuating magnets TAM in addition to operation by the typewriter keys. The record of the test of each quad consists of four columns and in each column is a test reading consisting of a number preceded by a sign. The number may consist of one, two or three digits. Each set of four tests is preceded by a test of the integrity of the insulation of the wires of the quad. The result of this test is not recorded in figures but if it fails owing to faulty insulation the testing is automatically stopped with the wiper PSW on the first contact 1 of the position switch PS.

The four wires of each of the quads to be tested are connected by hand in correct sequence to four sockets, one socket to a quad, at each end of the cable, namely ST1–ST4 at the apparatus end and SB1–SB4 at the other end of the cable. As the tests proceed the operators replace these quads by others in appropriate order so that there is always the appropriate number of quads available for the test and each quad of the cable is subjected in turn to the set of tests.

Figure 3:
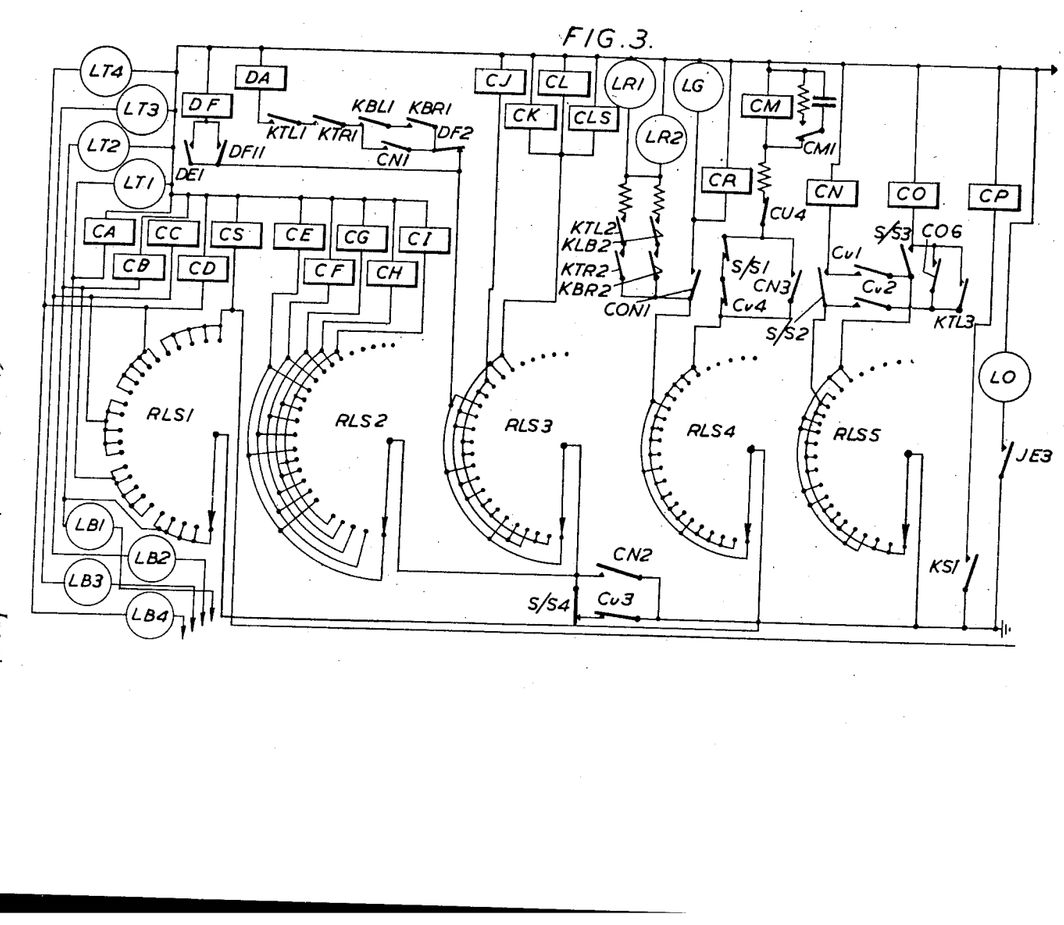
Figure 5:
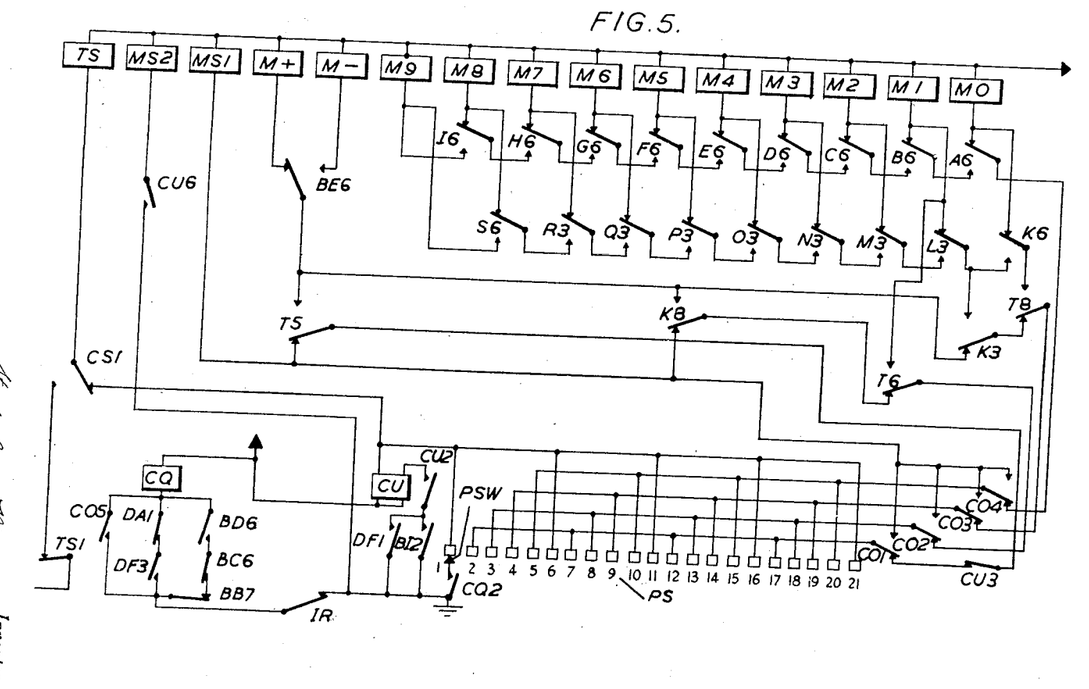

The apparatus includes a rotary line switch RLS (Figure 1) controlling a group of test selection relays TSR (Figure 1) by which are brought about the necessary circuit changes for selecting the quads by appropriately connecting the sockets in succession and selecting the appropriate tests for each quad. As shown in Figure 3 this switch comprises five levels RLS1–RLS5. This switch in conjunction with the test selection relays TSR which are described in more detail hereinafter, selects the quads to be tested in sequence and provides for each of the four tests to be recorded for each quad in sequence and for the correct terminating sequence. The switch provides for the primary insulation testing of each quad and, in conjunction with a hand operated key, provides for the omission of certain tests from the normal set of four when required. The rotary line switch is moved step-by-step by a magnet TS (Figure 5). Each level of the switch comprises twenty-five fixed contacts engageable by a rotary wiper, the wipers of all levels being ganged together mechanically so that at any time all the wipers are in the same angular position. The contacts in all the levels of the rotary line switch RLS are arranged in five groups of five, the first four groups corresponding to tests on four quads in succession, and the remaining group being inoperative except in the first level RLS1 where it is associated with a homing circuit for the switch.

The first level RLS1 controls relays CA—CD which determine the selective connection of the test sockets to a group of six bus-bars X1–X4, Y1 and Y2. From these bus-bars selective connections are made to the various testing circuits through the second switch level RLS2. In the normal non-operated condition shown in the drawings all the sockets ST1–ST4 are connected to earth. Under testing conditions all the core terminals in one socket are connected to the four bus-bars X1–X4 and two terminals of another socket are connected to the remaining bus-bars Y1 and Y2. The remaining socket terminals are earthed. The contacts in each group of five in switch level RLS1 are permanently connected together and the first, second, third and fourth groups are connected to socket selection relays CA, CB, CC and CD respectively. When for example the wiper of this level engages any contact in the first group, relay CA can be energised to close switches CA1—CA4 to connect socket ST1 to bus-bars X1—X4 and switches CA5—CA6 to connect two terminals in socket ST3 to bus-bars Y1 and Y2. When all the sockets have been so connected and tested, the wiper in this level contacts the final group of five contacts to energise a homing relay CS. This connects the rotary line switch magnet TS to earth through a changeover switch CS1 and its own interrupter switch TS1 (Figure 5) so that the switch homes to the starting position in which the wiper is again on the first contact. In the second level RLS2 the first contact of each group of five is connected to a relay CE which will close the switches CE1—CE4 to connect the insulation tester IS to the bus-bars X1—X4. This insulation tester IS may be of the form described in the specification of our United Kingdom patent application No. 13,146/52. It tests each core in sequence and the remaining tests cannot proceed if the insulation test reveals a faulty core. If the insulation test is satisfactory the relay DE is energised to close switch CE1 and energise relay DF, associated with the first, sixth, eleventh and sixteenth contacts of the third level RLS3, which holds by the closure of switch DF11. The insulation test has been initiated by the closing of a switch DA2 following the energisation of a relay DA. This relay DA is energised by the manual closing of a group of switches KTL1, KTR1, KBL1 and KBR1. When relay DF is energised at the end of the insulation test a switch DF2 opens to release relay DA.

It is convenient here to explain the procedure by which the machine operators initiate the testing operation. All the various current and voltage supplies are switched on by conventional arrangements. All the magnets and relays are directly connected to a D. C. supply indicated in the drawings by a large arrow, and they are energised by completing the appropriate circuits to earth terminals represented in the drawings in the conventional manner. At this stage the first level RLS1 of the rotary line switch provides the circuit connections already described. Certain switch keys are required to be closed by one operator employed at the apparatus end of the cable and by another operator at the other end of the cable. Before all these keys can be operated an electromagnetic lock, not illustrated, must be released by the closing of switch CON1 which is under the automatic control of the typewriter carriage. This switch CON1 is closed only when the carriage is in the starting position with the position switch wiper PSW on the first contact. This switch completes a circuit from the first contact of each of the four groups of five in the fourth rotary line switch level RLS4 to a signal lamp LG and the unlocking relay CR. The apparatus operator closes, with both hands, keys KTL and KTR, after first noting that a lamp LT1 indicates the connection of socket ST1. Switches KTL1 and KTR1 partially complete the circuit to relay DA, and switches KTL2 and KTR2 light lamps LR1 and LR2 at reduced voltage. The other operator, noting from lamp LB1 that the appropriate socket is connected to the correct quad at his end of the cable, closes with both hands keys KBL and KBR. This completes, at switches KBL1 and KBR1 the circuit to relay DA, from the first contacts in each of the four groups in the third level RLS3, which initiates the insulation test in the manner already indicated. At the same time switches KBL2 and KBR2 close to increase the illumination of lamps LR1 and LR2, giving a visible indication that the insulation testing has begun.

As indicated above, when the insulation test is completed satisfactorily, the circuit to relay DA is opened at switch DF2. When relay DA was energised a switch DA1 (Figure 5) was opened in the circuit to a typewriter relay CQ. This switch being now returned to the normal closed position completes the circuit to relay CQ through switch DF3, and switch CQ2 closes to earth the position switch wiper PSW which is on the first contact. This complete circuits to the stepping magnet TS for the rotary line switch and for a relay CU which holds by closure of switch CU2 in series with switch DF1. Relay CU closes switch CU6 to the spacer magnet MS2 which automatically prints a space in the first position and causes the typewriter to move through one step to the second position. At each movement of the typewriter an interrupter switch IR is opened and closed. This being opened deenergises relay CQ and opens switch CQ2 to break the circuit to the wiper PSW. The circuit to the stepping magnet TS being also broken the rotary line switch steps to the second position. This movement releases relay DF, opening switch DF1 to release relay CU and open the associated switches.

The remaining relays associated with the second rotary line switch level RLS2 operate as follows. Relay CF in the second position connects the capacitor bridge to the bus-bars X1—X4 through the switches CF1—CF4 for the purpose of the side-to-side tests. In the third position relay CG connects the bus-bars X1, X2, Y1 and Y2 to the capacitor bridge for the pair-to-pair test. In the fourth and fifth positions the relays CH and CI connect the appropriate bus-bars to the resistance bridge through the two switch groups CH1—CH3 and CI1—CI3 in sequence. The third level RLS3 operates in the first position in the manner already explained in connection with the insulation test. In the second and third positions, corresponding to capacity testing, relay CJ is energized. This connects to the capacitor bridge a voltage comparator VC at switches CJ1 and CJ2 and an oscillator OS at switches CJ3 and CJ4. The voltage comparator will be referred to in more detail hereinafter. In the fourth and fifth positions corresponding to resistance testing three relays CK, CL, and CLS are affected. Relay CK closes switches CK2 and CK4 to connect a D. C. supply and the voltage comparator to the resistance bridge. Switch CK3 also closes to energise relay VA which at switch VA1 alters the condition of the voltage comparator from A. C. to D. C. reading. Relay CL is energised to connect by a switch group CL1—CL4 a group of resistors into a standard artificial cable quad STD to enable the resistance unbalance check measurements to be taken, and relay CLS short circuits at a switch group CLS1 the four sockets SB1—SB4 at the far end of the cable. The fourth level RLS1 is associated with two control circuits, one operating as already described on the first of each group of five contacts at the start of testing and the other operating in the remaining four positions. The other control circuit includes a relay CM which serves to complete the circuits necessary for automatically balancing the bridges in the second to fifth positions of the rotary line switch. Relays CN and CO associated with the fifth level RLS5 are only effective when it is required to cut-out some of the tests. The effects of relays CM, CN and CO are described below.

The capacity and resistance bridges are adjusted to the balanced condition by the bridge adjusting relays BAR which introduce appropriate capacity and resistance into the variable arms of the bridges. The voltage comparator VC, which is of the form described in the specification of United Kingdom patent application Number 9,539/52, arrests the testing operation when the balanced condition is attained and also determines whether a negative or positive value is to be recorded. The voltage comparator VC includes a three-position sensitive relay BA incorporating a three-position switch BA1. In the second to fifth positions of the rotary line switch RLS the circuit to relay BA is closed by switch CM2. The initial unbalanced condition causes BA1 to move to one of its closed positions. Relay BH is energised to close switch BH1 (Figure 4) to prepare the circuits for the bridge adjusting relays. Relay BB or BC operates, according to whether the reading is negative or positive, and is held by the appropriate switch BB1 or BC1. Also switch BB3 or BC3 closes to energise relay BD, which is held at switch BD5. The relay BD, by closing at switch BD1 a circuit to relay BI sets the bridge adjusting relays in operation and also releases switch BI3 so that relay BB or BC is held only by its own switch BB1 or BC1. The apparatus is normally set to print a positive sign. Relay BC does not alter this condition, but if the reading is negative relay BB closes switch BB6 to relay BE which is held by its switch BE1 and changes the printing circuit at switch BE6 from printing magnet M+ to printing magnet M—. When balance is achieved, the three-position switch BA1 is brought to the centre zero position to release the appropriate relay BB or BC, and also relay BH which arrests further operation of the bridge adjusting relay group BAR by opening switch BH1. Relay BE, if operated, remains held by its own switch BE1, as does relay BD by its switch BD5.

The capacity bridge is balanced by successively switching in to the adjustable arm a number of capacitors which are added in steps by switches A3—I4, K4, L4—S4 and T7 until balance is reached. The bridge is normally connected to give positive readings but is altered to give negative readings by opening switch BE2 and changing over switch BE3. The resistance bridge is balanced by successively short-circuiting a series of resistances in the adjustable arm by means of switches A4—H4 and I5. This bridge is converted to give a negative reading by changing over switch BE5, opening BE4 and closing BE7. The bridge adjusting relay group BAR comprises the following relays. Relays A—I, the unit relays, are adapted to alter the bridges by one unit at a time to a maximum of nine by operating switches A3—I4 in the capacity bridge and A4—I5 in the resistance bridge. Each unit is 10 pf. in the capacity bridge and in the resistance bridge is equivalent to altering the value of the resistance arm by 0.1%. Relays K—S are the tens relays. Relay K at switch K4 adds 100 pf. to the capacity bridge or at switches K5 and K7 alters the resistance bridge by 1.0%. Relays L—S each add 100 pf. to the required arm of the capacity bridge at switches L4—S4. Relay T is the hundreds relay and adds a 1,000 pf. to the capacity bridge at switch T7. The relays L—T do not operate during resistance testing. Some of these relays have other functions. Relays A—I, and K—T prepare the appropriate circuits for the operation of the type actuating magnets TAM. Certain of the relays prepare the circuits for operating the next relay so that the system is self-running. Relays K and T also set the appropriate circuits to transfer the sign to another column if required, so that the sign is always printed directly before the first significant figure in the record.

The J group of bridge adjusting relays, J—JE, effect the transference of circuits from one of the other groups to the succeeding group. Relay JE operates differently from the others in that it is an excess value relay serving to stop the apparatus if a value in excess of the range of the machine is encountered. Relays J—JC effect the transference from the units relays to the tens relays, ensure that the units relays are released when required and that the tens relays operate at appropriate times. Relay JD operates in conjunction with relay J to release all the units and tens relays and replace them with the hundred relay T when the appropriate value is reached.

Figure 4:
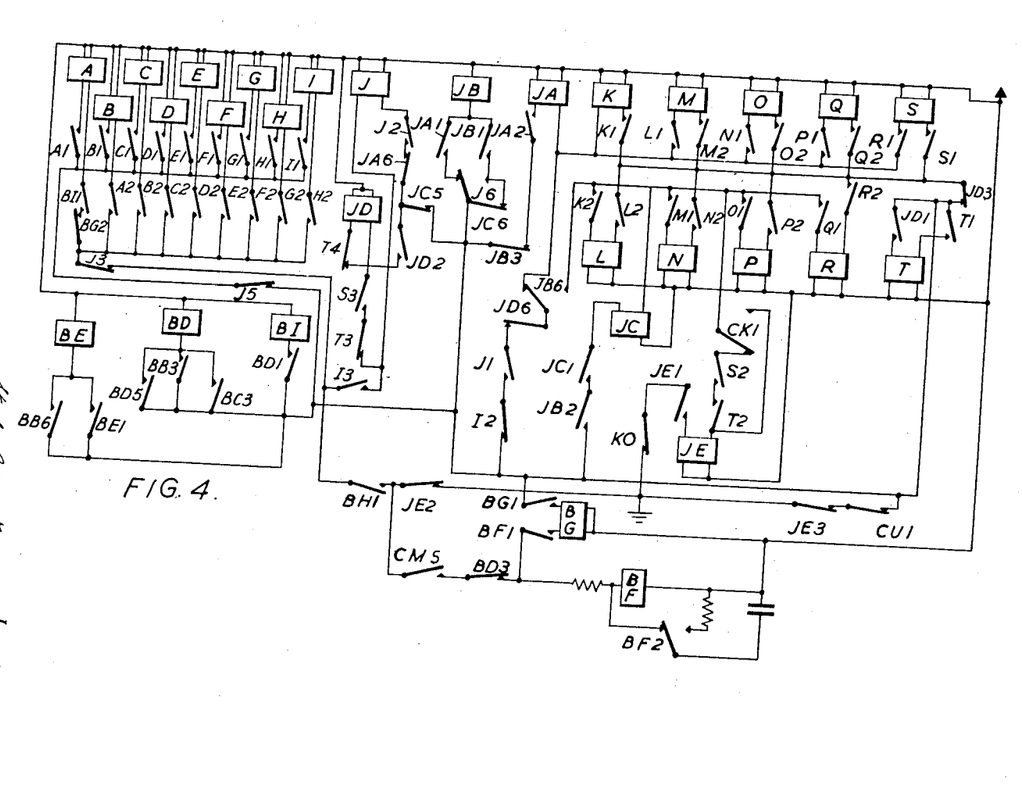

The units, tens and hundred relays are energised by switches controlled directly or indirectly by previous relays so that the balancing operations proceed continuously until stopped automatically at balance. The first units relay A is energised by closure of switch BI1 from relay BI and this closes switch A2 in the operating circuit of the next relay B. This is repeated until the ninth units relay I is energised when a somewhat different operation occurs. The units relays are held by their own switches A1—I1 to a holding line earthed through switch J5. At balance, switch BH1 opens to stop the operation of the relays, but those already energised remain operated by their holding switches. The relay I indirectly prepares the circuit for the first tens relay K. The relay I closes switch I3 to energise the transferring relay J, which holds at switch J2 and opens switch J5 to release the holding circuits for all the relays A—I. The tens relays are arranged in two groups, the upper group as shown in Figure 4 including the odd number relays K—S and the lower group containing the even number relays L—R. The selection of the appropriate relay groups is effected by two-way switch JB6 controlled by the relay JB. In the normal condition switch JB6 is set for relay K to be energised. When relay J is operated, and relay I thereby released, switches J1 and I2 complete a circuit through switch JB6 to relay JA and the first tens relays K. Switch JA1 closes to energise relay JB which holds by switch JB1. Relay K holds by closing switch K1 and switch K2 closes to prepare the circuit for the next tens relay L in the lower group. Relay JA has held at switch JA2 and released relay J at switch JA6. Relay JB releases relay JA by opening switch JB3, moves switch JB6 to the off-normal position to prepare the circuit for the second tens relay L and also prepares the circuit for relay JC by closing switch JB2. It will be seen that after one of the tens relays K, M, O, Q and S of the upper group has operated the relay JB is held so that switch JB6 is in the appropriate position for operation of one of the lower group of tens relays L, N, P and R, and switch JB2 is closed to prepare the circuit to relay JC. It will also be seen that relays JA and JC function alternately. When the conditions are such that the second tens relay L requires to be energised, relays I and J operate as before but relay JC is energised in place of relay JA. In this case relay J is released by the opening of switch JC5 and, switch JC6 having also opened, relay JB releases when switch J6 returns to normal. Relay JC is released by the opening of switch JB2 and a circuit for the next tens relay M in the upper group is prepared by the movement of JB6 to the normal position. The holding circuits for the tens relays K—S are earthed through switch JD3 and relay JD is used to release all these relays when the hundred relay T operates. The circuit to relay JD is prepared when the last of the tens relays S operates to close switch S3. It will be seen that switch JB6 has already been brought to the off-normal position but this does not affect relay T. When relay I next operates the closure of switch I3 energises relay JD while relay J is energised in the usual manner. Switch JD3 opens to release all the tens relays K—S while relay J is releasing all the units relay A—I. Switch JD6 also opens to prevent the operation of any of the relays L, N, P and R when relay I releases to reclose switch I2. The hundreds relay T is energised by switch JD1 and holds by switch T1. The relay T is sufficiently slow in action to ensure that it will not open switches T3 and T4 in the operating and holding circuits of relay JD until all the tens relays have cleared. When relay JD is released switch JD6 closes to energise relay JC through off normal switch JB6. This releases relay J by opening switch JC5 and relay JB is released by switch J6 going to normal and switch JC6 opening. Switch JB6 thus returns to normal to prepare the circuit for the next tens relay K and relay JC is released by the opening of switch JB2. When the value established by the bridge adjusting relays has been recorded, they are all released by the opening of switch CU1 as afterwards described.

When the value to be measured is in excess of that for which the apparatus is designed to measure the operation is automatically stopped. At the maximum value which can be measured relays S and T are energised at the same time and prepare a circuit to the excess value relay JE by closing two switches S2 and T2. At this stage switch JB6 is in the off-normal position. When relay J next operates the effect of closing switch J1 will be to energise relay JE, which is held by switch JE1 and brings the apparatus to rest by breaking the earth circuits at switches JE2 and JE3. The condition is now restored manually and relay JE released by manually opening switch K0 in its holding circuit.

The group of type operating magnets TAM comprises two space magnets MS1 and MS2, the sign magnets M+ and M— and the digit printing magnets M0—M9. Numbers 1, 6, 11, 16 and 21 of the position switch contacts are connected together to energise relay CU and print a space over magnet MS2 as already explained when switch CU6 closes. In all these positions except the first relay CU opens switch CU1 to release all the bridge adjusting relays at the end of a recording. Also switch CU3 connected between contacts 2, 7, 12 and 17 and the type actuating magnets prevents premature operation of these magnets as the position wiper PSW moves on to these contacts. Contacts 5, 10, 15 and 20 are normally connected to print any value from 0–9 according to the setting of the units relay switches A6—I6. Contacts 4, 9, 14 and 19 are normally connected to print a sign dependent upon the position of switch BE6. When the record contains two significant figures, the tens relay K has moved switch K3 into the off-normal position to connect these contacts to the group of magnets M1—M9, and the appropriate magnet is selected by the tens relay switches L3—R3 and S6. A cipher will be required in this position only when relay T has operated and no tens relay is operated; under these circumstances the magnet M0 is connected over switches T8 and K6. Contacts 3, 8, 13 and 18 are normally connected over switches T6 and K8 to the space magnet MS1. When there are two significant figures in the record these contacts are connected to one of the sign magnets by switch K8 off-normal and when there are three significant figures the operation of the hundred relay switch T6 connects these contacts to the digit magnet M1. The remaining contacts 2, 7, 12 and 17 are also connected together and, normally, to a space magnet MS1 by switch T5. When the record contains three significant figures the hundred relay switch T5 off-normal connects them to the circuit for the sign magnets M+ and M—.

The following description indicates the successive steps in the operation of the apparatus in the testing of four quads connected to the terminal sockets ST1—ST4. In the first position of the rotary line switch RLS the first quad is connected. The position switch wiper PSW is on contact 1 of the position switch and the insulation test is carried out resulting in the operation of relay DE. This causes the operation of the typewriter relays CQ and CU. The rotary line switch RLS is moved forward one step by its magnet TS, and the spacer magnet MS2 moves the typewriter carriage to carry the position switch wiper PSW to contact 2. The capacity bridge is brought into circuit by relay CF from the rotary line switch level RLS2 and the balancing operation is initiated by relay CM from the rotary line switch level RLS4. Switch BH1 closes in the operating circuit for the bridge adjusting relays BAR which balance the bridge in the manner already described, selecting the appropriate type actuating magnets TAM. When balance is attained, switch BH1 opens and the bridge adjusting relays are held in the operated position. Switches BB7 and BC6 having returned to normal and relay BD being held to close switch BD6, the typewriter relay CQ is re-energised to close switch CQ2. A printing circuit is thus completed through the wiper PSW and contact 2 of the position switch to the selected type actuating magnet. The typewriter is moved automatically step-by-step by the usual mechanism into the position corresponding to position switch contacts 3, 4, 5 and 6, operating a magnet in each position. In the sixth position, relay CU is again energised since switch BI2 is closed by relay BI which itself held by relay BD through switch BD1. Relay CM is now released by switch CU4, the bridge adjusting relays BAR are released by switch CU1 and the spacing magnet MS2 is operated by switch CU6. At the same time the magnet TS steps the rotary line switch RLS into the next position to energise relay CG from level RLS2. The apparatus now proceeds with the next test, the position switch being on contact 7. These operations are continued until all the tests have been made and recorded and the position switch wiper PSW is on the final contact 21. Again a space is printed by magnet MS2 and the magnet TS steps the rotary line switch to the sixth position while the typewriter carriage is returned by hand or automatically to the initial position with the position switch wiper on contact 1. Unless the position switch is so returned, switch CON1 will remain open and testing cannot be recommended. From the rotary line switch level RLS1 the next quad is connected for test by the relay CB. The sets of tests are repeated successively as the rotary line switch energises the two remaining quad connecting relays CC and CD, until the position switch wiper PSW engages contact 21 for the fourth time. The rotary line switch RLS now moves to the twenty-first position to energise the homing relay CS from the first level RLS1. This alters switch CS1 to provide a homing circuit to the magnet TS which returns the switch RLS to the first position. The operators having appropriately connected new quads to the sockets ST1—ST4 and SB1—SB4, the complete cycle of tests is repeated automatically and this repetition continues as long as the quads are correctly connected and no other conditions occur to arrest the operation.

If at the beginning of a test a bridge is balanced, that is the value to be recorded is zero, the relay BH will not operate because the three position switch BA1 remains in the central open circuit position. Switch BH1 in the bridge adjusting relay operating circuit will not be closed. To check that a true balance exists and that this condition is not due to a fault, a capacity-slugged relay BF operates after a short interval from the closing of switch CM5 to add a small capacity or resistance to one arm of the appropriate bridge. The resulting bridge unbalance is caused to operate the relay BA for starting the bridge testing but a value zero will be printed since the bridge adjusting relays will not function. The relay BF adds capacity to the positive side of the capacity bridge by closing switch BF3 or, by closing switch BF4, positively alters the balance of the resistance bridge. At the same time switch BF1 operates relay BG which opens switch BG2 in the circuit to the bridge adjusting relay A to prevent this and associated relays operating when switch BI1 eventually closes. The positive alteration of either bridge causes switch BA1 to move to the positive position to operate relays BH and BC. Relay BH is ineffective but relay BC starts the initial testing procedure by closing switch BC3 in the circuit to relay BD. This releases relay BF by opening switch BD3 and the bridge is returned to balance. This returns switch BA1 to the central position to release relay BC. The typewriter therefore prints a cipher because relay CQ is energised through the normally closed switch BC6 and the switch BD6 which has been closed by the relay BD. The relays BG, BD and BI are released as before by the opening of switch CU1. It will be seen that a zero reading is always preceded by a positive sign.

Arrangements are provided for eliminating either the insulation resistance test and the two capacity tests or the two resistance tests. For making the necessary circuit alterations there are provided two switch groups S/S and Cu mechanically coupled for manual operation. In one position the Cu group is operated for eliminating the first three tests and in the other position the S/S group is operated to eliminate the last two tests. In the first condition no testing takes place in the first three positions of the rotary line switch RLS. Switch Cu3 interrupts the earth connection to the second and third levels RLS2—RLS3 of the rotary line switch and switch Cu4 prevents the normal operation of the relay CM which normally initiates the bridge balancing operations in the second to fifth positions of the fourth level RLS4. Switch Cu2 closes to prepare a circuit to a relay CO from the first to third positions of level RLS5, and switch Cu1 prepares a circuit to relay CN from the fourth and fifth positions of that level. At the beginning of the tests the manual closing of switch KTL3 operates relay CO which holds by switch CO6. This relay sets switches CO1—CO4 into position to connect all the position switch contacts, except 1, 6, 11, 16 and 21, to the spacer magnet MS1, and closes switch CO5 to operate the typewriter magnet. The typewriter will thus step through the first fifteen positions without recording, while the rotary line switch moves through the first three positions without initiating testing. On contact 16 of the position switch the rotary line switch has moved to the fourth position to release relay CO from the fifth level RLS5 and return all the CO group of switches to normal. From this level relay CN is operated, closing switch CN2 to restore the earth connection to the rotary line switch levels RLS2—RLS3 and closing CN3 to prepare the circuit to relay CM from the fourth level RLS4. Conditions are therefore restored for the two final tests to be carried out and recorded in the normal manner. In the second condition no testing is to be carried out in the fourth and fifth positions of the rotary line switch. The normal circuits to relay CM and switch levels RLS3—RLS4 are broken by switches S/S1 and S/S4 respectively. Relay CN is operated in the first to third positions of the rotary line switch by switch S/S2 and relay CO in the fourth and fifth positions by switch S/S3. It will be seen that the operation of relays CN and CO in the reverse order to that already described, but in the same manner, will produce the required result.

In order to check the operation of the apparatus a switch KS1 is closed manually to operate a relay CP which by closing the switch group CP1—CP6 connects to the busbars X1—Y2 a circuit network STD simulating a standard cable.

What we claim as our invention is:

1. Apparatus for automatically obtaining and printing the reading of an instrument or a group of instruments and for printing successive readings as columns of figures on a record sheet, comprising a record sheet carrier, means for producing relative step-by-step movement between the carrier and a printing position, a number of type-actuating electro-magnets, a cascade of relays for selecting circuits through the electro-magnets, means responsive to each instrument reading for actuating the relays to prepare the circuits to the type-actuating electro-magnets appropriate for that reading, a position switch operatively connected with and actuated by the relative step-by-step movement of the carrier, circuits to the electro-magnets for selection by the position switch according to the position of the carrier, and means for interrelating the circuits established by the cascade of relays with the circuits established in an associated position of the position switch to actuate the appropriate electro-magnets to print a part of the reading.

2. Apparatus for automatically altering the impedance of a measuring circuit to balance the circuit in a succession of tests and for printing the values of the impedance alterations for successive tests as columns of figures on a record sheet, comprising a number of type-operating electro-magnets, a record sheet carrier, means for producing relative step-by-step movement between the carrier and a printing position, a set of relays arranged to act in sequence to alter the impedance in steps until balance is obtained, means for preparing through the relays at balance electro-magnet circuits appropriate for printing the value of the impedance alteration, a position switch operatively connected with and actuated by the relative step-by-step movement of the carrier, circuits to the electro-magnets for selection by the position switch according to the position of the carrier, and means for interrelating the circuits established at the balance setting of the relays and at the associated position of the position switch to actuate the appropriate electro-magnets to print a part of the record of the value.

3. Apparatus as claimed in claim 2, including holding means for retaining the setting of the relays until the impedance value is printed and means actuated by the movement of the position switch for then restoring the relays to the starting condition.

4. Apparatus as claimed in claim 2, in which the relays include units, tens and hundreds groups, and transfer relays for initiating the operation of the two higher denomination groups after the operation of all the relays in the next lower denomination group and for returning all the relays in the lower denomination group to their initial positions.

5. Apparatus for automatically altering the impedance of a measuring circuit to balance the circuit in a succession of tests and for printing the values of the impedance alterations for successive tests as columns of figures on a record sheet, comprising a number of type-operating electro-magnets, a record-sheet carrier movable step-by-step relative to and through a printing position, a position switch operatively connected to the carrier to establish circuits determined by the position of the carrier, a set of relays arranged to operate in sequence to alter the impedance in steps until balance is obtained, means for preparing through the relays at balance electro-magnet circuits appropriate for printing the value of the impedance alteration, an operating circuit and a holding circuit for the relays, a circuit responsive to the condition of the circuit to be balanced for interrupting the relay operating circuit at balance, means for interrelating the circuits established at balance by the relays and by the associated position of the position switch to actuate the appropriate electro-magnets to print a part of the record of the value and means controlled by the position switch for releasing the relay holding circuit.

6. Apparatus for automatically altering the impedance of a measuring circuit to balance the circuit in each of a series of tests in succession and for printing the values of the impedance alterations for successive tests as columns of figures on a record sheet, comprising a number of type-operating electro-magnets, a record-sheet carrier movable step-by-step relative to and through a printing position, a position switch operatively connected with the carrier to establish circuits determined by the position of the carrier, a set of relays arranged to operate in sequence to alter the impedance in steps until balance is obtained, means for preparing through the relays at balance electro-magnet circuits appropriate for printing the value of the alteration, means for interrelating the circuits established by the relays at balance and circuits established by the associated position of the position switch to actuate the appropriate electro-magnets to print a part of the record of the alteration, a test-selection-switch movable step-by-step for preparing the circuits to be tested and means actuated by the movement of the position switch at the recording of each test to move the test-selection-switch into position for the establishment of the next test.

7. Apparatus as claimed in claim 6, including means for balancing a capacity bridge and a resistance bridge in sequence, the relays being effective to alter capacitance and resistance in the appropriate bridge and the test-sequence-switch being adapted to establish the appropriate connections between the bridges and the relays.

8. Apparatus for automatically determining the impedance of each of a group of circuits by subjecting each circuit in turn to a series of impedance bridge tests and for printing the bridge readings for successive tests in each series as a column of figures on a record sheet and as separate lines for the separate circuits of the group, comprising a number of type-operating electro-magnets, a record-sheet carrier movable step-by-step relative to and through a printing position, a position switch operatively connected to the carrier to establish circuits determined by the position of the carrier, a set of relays arranged to operate in sequence to alter the bridge impedance in steps until balance is obtained, means for establishing through the relays at balance electro-magnet circuits appropriate for printing the value of the alteration, means for interrelating the circuits established by the relays at balance and circuits established by the associated position of the position switch to actuate the appropriate electro-magnets to print a part of the record of the impedance alteration, a test-sequence-switch movable step-by-step for preparing the circuits in sequence for testing each circuit in the group and for each test in each series, means actuated by the position switch at the recording of each test for moving the test-selection switch into position for establishing the next test and also means actuated by the position switch for returning the carrier to the initial position for recording another line of figures at the end of each series of tests.

References Cited in the file of this patent
UNITED STATES PATENTS
2,116,606     Lemmon _______________ May 10, 1938